(12) United States Patent
Weisbecker et al.

(10) Patent No.: US 12,165,479 B2
(45) Date of Patent: Dec. 10, 2024

(54) SELF-DISABLING TAMPER-EVIDENT GIFT CARDS

(71) Applicant: SUN CHEMICAL CORPORATION, Parsippany, NJ (US)

(72) Inventors: Carl Weisbecker, Carlstadt, NJ (US); Mohammad S. Farahat, Wyckoff, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 228 days.

(21) Appl. No.: 17/761,281

(22) PCT Filed: Sep. 17, 2020

(86) PCT No.: PCT/US2020/051203
§ 371 (c)(1),
(2) Date: Mar. 17, 2022

(87) PCT Pub. No.: WO2021/055557
PCT Pub. Date: Mar. 25, 2021

(65) Prior Publication Data
US 2022/0415112 A1    Dec. 29, 2022

Related U.S. Application Data

(60) Provisional application No. 62/903,151, filed on Sep. 20, 2019.

(51) Int. Cl.
*G07F 7/08* (2006.01)
*G06K 19/06* (2006.01)

(52) U.S. Cl.
CPC ..... *G07F 7/0813* (2013.01); *G06K 19/06056* (2013.01)

(58) Field of Classification Search
CPC ....... G06K 19/06046; G06K 19/06056; G06K 19/10; G06Q 20/354; G07F 7/0813
See application file for complete search history.

(56) References Cited

U.S. PATENT DOCUMENTS

5,770,318 A    6/1998  Friedman
7,909,363 B2 *  3/2011  Anderson ............. G09F 3/0288
                                                    283/105
(Continued)

FOREIGN PATENT DOCUMENTS

| CA | 2689347 | 12/2008 |
|----|---------|---------|
| GB | 2527508 | 12/2015 |
| WO | WO 2018/122362 A1 | 7/2018 |

OTHER PUBLICATIONS

International Search Report issued in International Application No. PCT/US2020/051203, mailed Dec. 18, 2020.
(Continued)

*Primary Examiner* — Thien M Le
*Assistant Examiner* — April A Taylor
(74) *Attorney, Agent, or Firm* — Marian E. Fundytus; Ostrolenk Faber LLP.

(57) ABSTRACT

The present invention provides self-disabling tamper evident gift cards, and methods for making and using the gift cards. The gift cards comprise a hidden lower level activation code, and an upper level activation code that is visible. The gift cards incorporate one or more features that render either the lower level or upper level, or both, activation codes unreadable once the lower level activation code is revealed. This prevents card activation at a later time after a first instance when the activation code is accessed.

24 Claims, 10 Drawing Sheets

(56) References Cited

U.S. PATENT DOCUMENTS

| | | |
|---|---|---|
| 8,931,639 B2 | 1/2015 | Payne |
| 9,511,919 B2 | 12/2016 | Payne |
| 10,275,698 B2 | 4/2019 | Pascua et al. |
| 10,318,962 B2 | 6/2019 | Rivlin et al. |
| 2006/0243792 A1 | 11/2006 | Morello et al. |
| 2016/0140569 A1 | 5/2016 | Rivlin et al. |
| 2017/0061834 A1 | 3/2017 | Versluys et al. |
| 2017/0243098 A1 | 8/2017 | Pascua et al. |
| 2019/0073577 A1 | 3/2019 | Tomczyk |
| 2020/0034825 A1* | 1/2020 | Levy .................... G06Q 20/354 |

OTHER PUBLICATIONS

Written Opinion of the International Searching Authority issued in International Application No. PCT/US2020/051203, mailed Dec. 18, 2020.

International Preliminary Report on Patentability (Chapter 1 of the Patent Cooperation Treaty) issued in International Application No. PCT/US2020/051203, mailed Nov. 12, 2021.

* cited by examiner (i)

(ii)

(iii)

(ii)(a)

(i)

(ii)

(iii)

(i)

(ii)

SELF-DISABLING TAMPER-EVIDENT GIFT CARDS

CROSS REFERENCE TO RELATED APPLICATIONS

The present application is a § 371 National Phase application based on PCT/US2020/051203 filed Sep. 17, 2020, which claims the benefit of U.S. Provisional Application No. 62/903,151, filed Sep. 20, 2019 the subject matter of each of which is incorporated by reference in their entirety.

FIELD OF THE INVENTION

The present invention provides tamper-evident value (gift) cards. The cards incorporate a hidden activation code with a self-disabling feature that prevents card activation at a later time after a first instance when the activation code is accessed. In certain embodiments, two activation codes are required.

BACKGROUND OF THE INVENTION

A gift card, also referred to as a value card, is defined as a prepaid money card, which is issued by either a retailer or a bank to be used as an alternative to cash for purchases. The monetary value of the card can only be redeemed in a particular store or limited group of businesses. The prepaid money associated with the gift card is typically held in an account by the retailer or bank until the gift card is presented, either in person or online, to redeem the value for a store purchase.

A gift card physically carries on it some type of unique identifier, which links that card to the value of funds held in an account. A gift card differs from other cash alternatives, such as a debit card or credit card, in that the latter cash substitutes have a specific traceable person identified with the card account. In contrast, the identity of a gift card bearer may be anonymous and unknown to the retailer or bank that issues it. The greater anonymity of gift card purchases creates a security risk, and a heightened potential for gift card tampering with intent to steal the value of the card from its bearer.

The unique identifier of a gift card may take the form of a numeric or alpha-numeric code similar to a credit card number. It might also be encoded on a magnetic strip or in a form readable by an optical device, such as a one-dimensional or two-dimensional bar code scanner.

Gift cards are widely available for purchase in retail stores, and are commonly on display for viewing by potential card buyers. A thief can potentially steal the monetary value of a gift card by copying the unique identifier from the card on display, without buying the card. The thief anticipates that money will later be deposited in an account associated with the card when someone else purchases the same card in the store. The thief can use the copied card identifier to make a counterfeit card to present in a store to withdraw funds before the card's true bearer comes to present it. Alternatively, the thief can enter the copied unique identifier remotely at a website to make an online store purchase. Money in the store or bank account associated with the gift card can thus be fraudulently taken by someone other than the true bearer of the card.

There are a variety of tamper-evident label materials available from 3M Company, including 7610 ScotchMark Destructible White Vinyl. The 7610 product uses a fragile cast vinyl face with very low tensile strength and tear resistance. The 7610 product is designed to crack and break when peeled off of a surface because the permanent adhesive bond is stronger than the label face. Other types of tamper-indicating labels utilize a "void" pattern in adhesive, as with EM 7866 Polyester. This product uses a clear polyester face stock with a white pigmented adhesive. A silicone type pattern is printed on back of the label face such that as the label is peeled away from a surface, only part of the adhesive removes with the label. The adhesive pattern is such that it creates a "VOID" word pattern across the label face stock. Applications for destructible tamper-evident labels include safety warning labels, warranty seals, packaging seals, license labels, calibration seals, and asset labels, among others.

There is a history of different security features added to gift cards in the prior art. However, there is a tradeoff to these features in that added layers of security increase the cost to manufacture the card, and diminish the level of ease and convenience for the bearer of the card. The retailer or bank that issues the card may also need to invest in a more complex and expensive computer network to manage gift card accounts with multiple identifiers.

A key deficiency of current tamper-evident features in gift cards is that the tamper-evident feature may be able to show only visual evidence of prior tampering, such as a burst score line adjacent to a label, or a color change due to uncovering a hidden identifier. However, the visual cue may yet go unnoticed or may be ignored, and a gift card that has been tampered with activated anyway. The act of tampering with the card leaves visual evidence but does not prevent the card from being activated and used.

US 2016/0046428 describes tamper-evident gift card packaging designs, and methods of construction. U.S. Pat. Nos. 9,511,919 and 8,931,639 disclose card packaging designs that show evidence of tampering. US 2006/0243792 discloses a gift card design.

US 2017/0243098 and U.S. Pat. No. 10,275,698 disclose tamper evident labels. GB 2527508 teaches a tamper-evident adhesive label. U.S. Pat. No. 10,318,962 teaches multilayer authentication labels used for tracking and verifying the authenticity of items. US 2017/0061834 teaches a tamper evident tag that incorporates an oxidizing color change ink layer, and is used to, for example, indicate that a bag of food has been opened and exposed to the air, and the packaged item may no longer be good.

US 2019/0073577 teaches two-step tamper-evident card activation systems, comprising labels that have perforations and cut scores, so that the label tears when it is removed. The label is not actually destroyed, and a determined person could reconstruct the label, and the security of the card may still be breached. CA 2689347 teaches a two-layer activation system. An opaque layer covers a first indicia, and a second indicia is printed partially over the opaque label.

There is still a need in the art for gift card activation systems that are completely disabled if there is any tampering before such time as the gift card is authentically activated.

SUMMARY OF THE INVENTION

The present invention provides self-disabling tamper evident gift cards. The gift card of the invention comprises an activation system which has at least one, and preferably two activation codes. A lower level activation code is printed on the card, and is hidden by an opaque layer. In certain embodiments, the opaque layer is a label. When the opaque layer is a label, it may be inherently be an opaque substrate (e.g. paper), or it may be made opaque by application of an ink or colored adhesive on a clear substrate. An upper level activation code is printed on the opaque layer. Both activation codes must be read to activate the card. After scanning the upper level activation code, the opaque layer must be removed to render the lower level activation code visible and able to be scanned. Removal of the opaque layer renders the upper level activation code unreadable. Or, alternatively, removal of the opaque layer results in activation of a security feature that renders the lower level activation code unreadable after a short amount of time. Thus, both codes can only be accessed once, and must be scanned at a point of purchase.

In a particular aspect, the present invention provides a self-disabling tamper evident value card activation system comprising:
 a) a substantially planar substrate that is the value card;
 b) a lower level redemption and/or activation code printed on a surface of the card;
 c) a removable label having a top surface, and a bottom surface that comprises an adhesive where the bottom surface faces the surface of the card, wherein the label is applied over the lower level activation code, and the lower level code is hidden by the label; and
 d) an upper level observable activation code printed on a top surface of the label; wherein:
  i. both the lower level hidden code and the upper level observable code must be read to activate the card; and
  ii. removal of the label renders the upper level activation code unreadable, or the lower level activation code unreadable, or both the upper level and lower level activation codes unreadable.

The present invention provides various configurations of card activation systems that ensure that the information to activate a card may only be accessed once, thereby preventing card activation if the gift card has been tampered with by a thief.

In certain embodiments, the upper level activation code is read or scanned while the opaque layer remains intact on the gift card. Removal of the opaque layer reveals the lower level activation code, and at the same time renders the upper level activation code unreadable.

In other embodiments, the lower level activation code is readable for only a short time after removal of the opaque layer.

These and other objects, advantages, and features of the invention will become apparent to those persons skilled in the art upon reading the details of the formulations and methods as more fully described below.

BRIEF DESCRIPTION OF THE DRAWINGS

FIG. 1 shows a gift card (101) with a lower level activation code (102) with locator and alignment marks (103, 104), a label applied over the lower level activation code (105) with clear windows aligned to marks (106), and an upper level activation code (107) printed in alignment with the locator and alignment marks on the gift card.

FIG. 2 shows a gift card (101) having printed thereon a lower level activation code (102) with adjacent start/stop codons in a different format adjacent to the lower level activation code (201), and a label over the lower level activation code (105) with clear windows aligned to start/stop codons (106), having printed thereon an upper level activation code (107) that is in the same format as the start/stop codons adjacent to the lower level activation code.

FIG. 3 shows a gift card (101) having printed thereon a lower level activation code (102) with adjacent start/stop codons in in the same format as the lower level activation code (301), and a label over the lower level activation code (105) with clear windows aligned to start/stop codons (106), having printed thereon an upper level activation code (107) that is in the same format as the start/stop codons adjacent to the lower level activation code.

FIG. 4 shows a gift card (101) wherein the lower level activation code is written with an ink having a non-stick release property (402) on a black background (401), with an adhesive label (105) applied over the lower level activation code. The label structure includes a clear transparent substrate layer (406), a solid release varnish (405), a solid white ink (404), and an adhesive layer (403) FIG. 4 also shows an activation process wherein adhesive from the label sticks to the black background when the label is removed, rendering the upper level activation code unreadable.

FIG. 5 shows a gift card (101) wherein the lower level activation code (502) is printed with a light sensitive color change ink, and the adhesive label covering it is a color tinted film that blocks the wavelengths of light that the light sensitive ink is sensitive to (501). An upper level activation code is printed on the color tinted film label (107). FIG. 5 depicts the activation process using the gift card. Removal of the covering label (501) exposes the light sensitive ink to light (503), which causes the lower level activation code (502) to become visible.

FIG. 6 shows a gift card (101) wherein a clear coating that darkens upon exposure to a developer (601) is applied over the lower level activation code (102). The gift card surface is joined to a laminate structure (602). The structure incorporates a peelable pull tab (603), a clear transparent layer with a slot (604), a chemical developer layer (605), and an adhesive layer (403) that holds the pull tab in place. An upper level activation code (107) or a PIN # (606) may be printed on the surface of the pull tab. FIG. 6 also shows a process of activation initiated by removing the pull tab.

FIG. 7 shows a gift card (101) comprising a layer of p-type photochromic ink (701), upon which the lower level activation code is imaged through a mask (702) using wavelengths of light that are not visible (703). The layer of photochromic ink and lower level activation code (102) are covered with an opaque adhesive label (105). FIG. 7 also shows the process of activation initiated by removal of the label.

FIG. 8 shows a gift card (101) with a lower level activation code (102) with locator and alignment marks, a label applied over the lower level activation code (105), and an upper level activation code (107) printed in alignment with the locator and alignment mark on the gift card. Removal of the label causes distortion of the label and the upper level activation code.

DETAILED DESCRIPTION OF THE INVENTION

Figure 1A:
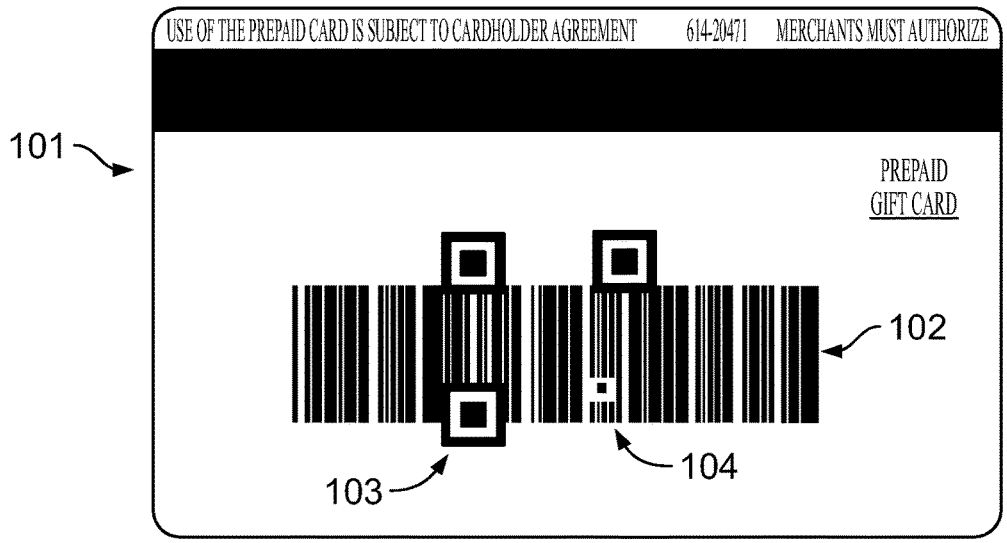
FIG. 1.

The present invention provides self-disabling tamper evident gift cards, comprising an opaque layer applied over a lower level activation code. An upper level activation code is printed on top of the opaque layer. Both the upper level and lower level activation codes must be scanned or read at the time of purchase for activation of the card. Removal of the opaque layer renders either the upper level activation code unreadable, or the lower level activation code unreadable, or both the upper level and lower level activation codes unreadable.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, "gift card" and "value card" are used interchangeably, and are defined as a prepaid money card, which is issued by either a retailer or a bank to be used as an alternative to cash for purchases.

As used herein, the "lower level activation code" is the code that is printed directly on the gift card substrate.

As used herein, "substrate" means any surface or object to which an ink or coating can be applied.

As used herein, the "upper level activation code" is the code that is printed on top of the opaque layer.

As used herein, when marks or other information are printed "adjacent" to the lower level activation code, this means that they are printed either next to or slightly overlapping the lower level activation code.

As used herein, the term "opaque layer" refers to a layer within the structure of a label that blocks transmission of light. The term "opaque layer" may also refer to an opaque substance, such as an ink or adhesive, applied to a surface of a label substrate.

As used herein, the "light sensitive color change ink" is a printed ink layer containing an initially colorless substance capable of forming color irreversibly when activated by exposure to light.

As used herein, the "p-type photochromic ink" is a printed ink layer containing an initially colorless substance capable of reversibly forming color when activated by exposure to light within one range of wavelengths (e.g. ultraviolet wavelengths) and which is only capable of reverting back to a colorless state when activated by exposure to light within a second range of wavelengths (e.g. visible wavelengths).

Self-Disabling Tamper Evident Gift Cards

What is deficient and lacking in the prior art and which is provided by the present invention are designs for tamper-evident gift cards in which the act of tampering with the card will necessarily disable a process of card activation, whether or not the prior tampering has been noticed. The inventive designs are hereinafter referred to as "self-disabling." The designs of the invention increase the value and attractiveness of in-store purchased gift cards by improving their security against theft of the card value. These self-disabling designs have not been previously described.

In one embodiment, a gift card with a two-step tamper-evident activation process includes a card with an initially inactive state. A hidden activation code is printed on the card with an initially inactive state. The hidden lower level activation code is printed on the card in the form of a bar code. The bar code itself contains variable data specific to each individual card. This bar code may be a linear bar code with symbology chosen from among any of the standard bar code types, such as Code 39, Code 128, or other choices. It may also be a two dimensional bar code, such as a QR code. Types of bar code symbology include, but are not limited to, Code 39, Code 128A, Code 128B, GS1-128, UPCa, UPCe, EAN13, EAN8, Interleaved 2 of 5 (ITF), Codabar, Industrial 2 of 5, Code 11, Code 93, GS1 DataBar, DataBar Expanded, DataBar Expanded Stacked, DataBar Omni-Directional Stacked, DataBar Truncated, GS1 DataBar Limited, GS1 DataBar Coupon code, MSI Plessey, POSTNET, PLANET, USPS IMb, MICR E13B, MICR CMC7, OCRa, OCRb, PDF417, Data Matrix ECC200, GS1 DotCode, MaxiCode, Aztec, QR-Code, and the like. It is to be understood that any type of bar code symbology can be used, and that the lower level and upper level activation codes may be in the same or different formats.

The lower level activation code is then completely or partially covered by an opaque layer. In certain embodiments, the opaque layer is an adhesive label. The lower level activation code is covered to the extent that the lower level activation code information cannot be read.

A second, upper level activation code is printed onto the top surface of the label. This upper level activation code may also be any type of one-dimensional or two-dimensional bar code.

The process of card activation will occur in a store cash register. The process of activation will include a first step of reading the upper level activation code on the label. Reading of the upper level activation code may cause a web page to open where the card buyer will be required to register the card or to provide additional identifying information for added security. However, reading the upper level activation code is not limited to this, and may involve eliciting any type of activation protocol. The label will then be peeled off to reveal the hidden lower level activation code, which is needed to complete the activation process. The lower level activation code may also function as a unique identifier to be used again later when the card is presented to withdraw money.

Furthermore, the label is designed so that its removal from the card will unavoidably stretch and distort the printed pattern of the upper level activation code to an extent that the upper level activation code no can longer be read. Therefore, the card's activation is self-disabling. If a thief peels away the label to reveal the card's hidden identifier and then reapplies the label, then the label will have visible distortion that evidences tampering, and the distorted upper level activation code will fail to read.

In one embodiment, the label can be designed in the following way. The adhesive of the label is chosen such that it forms a strong cohesive bond between the card surface and the label substrate. The cohesive bond of the label must be weak enough so that the label can be easily peeled off, but must also be strong enough to overcome the structural integrity of the label substrate to cause distortion and stretching of the peeled label. In certain embodiments, the adhesive should preferably also peel cleanly from the surface of the gift card, leaving little or no sticky adhesive residue remaining on the card surface. Preferred adhesives for this embodiment of the invention are pressure sensitive adhesives with high peel strength, most preferably water-based emulsion adhesives. Specific examples of preferred water-based emulsion adhesives include E5740 and E5710 Adhesives from Avery Dennison, and Novacryl PS-P 180 from Omnova.

Adhesives might also be modified to optimize their properties, such as by addition of tackifiers or plasticizers. Examples of tackifiers include Dermulsene 1513, Dermulsene TR602, Tacolyn 1070, and Tacolyn 3570. Examples of plasticizers include Benzoflex 9-88 SG.

Other types of adhesive could also be used to achieve required performance in the application, including UV curable adhesives, solvent-based adhesives, or hot-melt adhesives.

Adhesive might also be advantageously applied in the form of a pattern to further influence the label distortion when peeled. Adhesive might also be patterned to carve out a non-adhering peel tab on one corner or edge of the label to facilitate ease of removal.

Adhesive might be coated directly onto the film (i.e. substrate) surface, or it might alternatively be first cast onto a release liner or transfer liner. The adhesive coated liner would then be joined to the extensible film of the label.

The label substrate will preferably be a polymer film with high extensibility. A preferred film substrate material is a clear or tinted polyolefin film, most preferably a linear low density polyethylene (LLDPE) film. Some specific examples of extensible LLDPE films suitable for the present invention are described in U.S. Pat. No. 5,770,318. Another example of extensible polyolefin film is Parafilm M supplied by Bemis/Amcor. Other examples of extensible polyolefin films include Duraseal and Duraseal Cling films supplied by Diversified Biotech, stretch wrap films from Uline, and polyethylene shrink bundling films.

Films suitable for this invention have properties of high extensibility, high elongation at break, low tensile modulus, and high tear resistance. The unstretched film thickness should be within a range of about 12 μm to 130 μm, preferably 25 μm to 80 μm.

The top surface of the label of the present invention must be capable to be overprinted with the upper level activation code. Therefore, it must have a color that provides contrast with the overprint to read the upper level activation code. The color of the upper surface of the label should preferably be white.

One or more layers of opaque material are required in the label structure to cause the lower level activation code underneath the label to be rendered unreadable. The extensible film might itself contain pigments that provide enough opacity to hide the lower level activation code. Furthermore, the opaque layer(s) should preferably also obscure the lower level activation code in the infrared spectral region if the label is viewed with an infrared imaging device.

The opaque layer preferably consists of a top-surface pigmented film laminated or sealed to, or coextruded with, a bottom-surface polyolefin film to make a multi-ply film structure, such as a white top film joined to a tinted or black bottom film.

Alternatively, the opaque layer might consist of a pigmented adhesive layer on the bottom surface of the film. Or, the opaque layer or layers may consist of ink printed on the top surface of the label, such as a solvent-based flexographic or gravure printed white ink. Specific examples are Sun-Sharp White Ink from Sun chemical and Flexomax High Opacity White Ink from Sun chemical. Alternatively, the opaque ink layer might be reverse-printed onto the bottom surface of the film between the film and the adhesive.

The extensible polyolefin film, which has sufficient opacity to hide the underlying lower level activation code, may nevertheless reveal barcode information by conforming closely to the raised relief pattern of the barcode print underneath it. The shape of the underlying barcode may appear as an embossed relief pattern in the top surface of the label film. This effect potentially compromises the security provided by the label.

To avoid this problem, the polyolefin film most preferably has a microscopic surface structure embossed into its upper and lower surfaces to suppress or eliminate the visible appearance of a relief pattern from the underlying barcode. We found that an array of square grid lines with approximately 200 μm spacing embossed into the polyolefin film eliminates the barcode relief pattern. A similar polyolefin film without embossing conforms to the underlying print and shows a visible relief pattern on its surface.

An optional feature of the opaque ink layer or layers is that the opaque ink may be designed to crack and delaminate from the underlying substrate when the underlying film is stretched. The cracking of the ink provides visible evidence of tampering.

Optionally, the hidden lower level activation code might be printed on the card with some superimposed or added marks, which are locator or alignment marks or start- and stop-codes belonging to the upper activation code. FIG. 1A shows an example of a linear barcode on a gift card with superimposed marks.

Figure 1B:
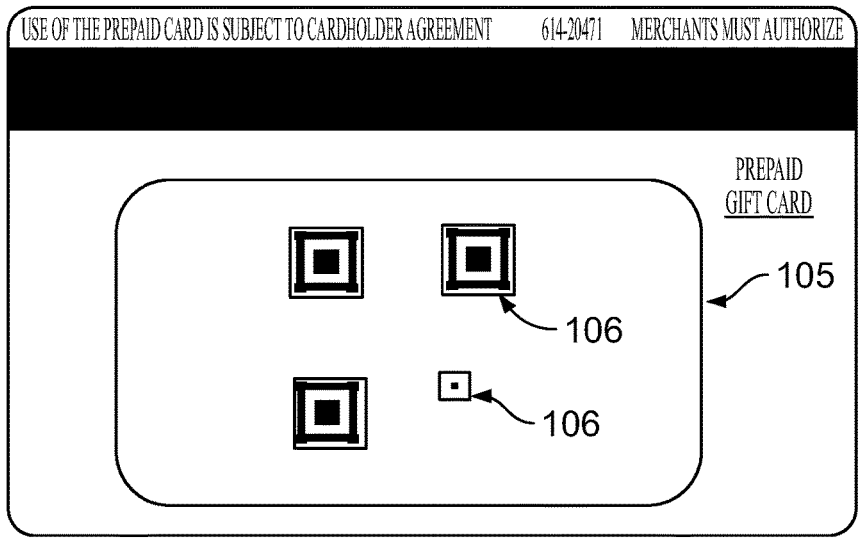

The lower barcode is then completely or partially covered by an adhesive label to an extent that the lower barcode information cannot be read. The label is printed with ink to provide an opaque layer, except with clear film windows aligned to positions of the locator or alignment markings on the card surface, The ink layer otherwise covers the lower barcode to an extent that prevents reading of the hidden code. FIG. 1B shows an example of an opaque label with clear windows concealing a hidden barcode with superimposed marks.

Figure 1C:

The second upper level code is printed onto the top surface of the label, omitting the alignment or locator marks or start- and stop-codes that enable it to be scanned. The printed upper code will be sufficiently aligned on the label so that the combination of the printed pattern on the label and markings on the card surface, visible through transparent label windows, can be successfully read and interpreted as a complete upper-barcode by a scanner. FIG. 1C shows an example of QR code data printed on a label aligned with locator and alignment marks printed on the gift card visible through windows.

Removal of the label from the card unavoidably stretches and distorts the printed pattern on its surface to an extent that the pattern on the label cannot be realigned with the underlying locator or alignment marks or start- and stop-codes on the card. The displacement of the locator marks and alignment mark from the data portion of the code prevents a scanner from interpreting the code. Therefore, the card's activation process is self-disabling. If a thief peels away the label to reveal the card's identifier and then reapplies it, the label will have visible distortion that evidences tampering, and the misaligned code will fail to read.

This embodiment is depicted in FIG. 1. FIG. 1A is a gift card (substrate) 101, having printed thereon a lower level activation code 102, locator marks 103, and an alignment mark 104. FIG. 1B is the gift card 101, having applied thereon a removable label 105, with clear windows 106 through which the locator marks 103 and the alignment mark 104 are visible. FIG. 1C shows an upper level activation code 107, printed in alignment with the locator marks 103 and the alignment mark 106. In FIG. 1 the lower level activation code is in the form of a one-dimensional linear bar code, and the upper level activation code is in the form of a QR code. However, the lower level and upper level activation codes are not limited to these formats.

In another embodiment, the hidden activation code is printed on the card in the form of a one-dimensional barcode with a superimposed pattern consisting of the start and stop patterns of a PDF417 stacked linear bar code. The one-dimensional barcode itself contains variable data specific to each individual card, but the superimposed markings contain no variable data. The one-dimensional bar code also has start and stop patterns, but these patterns have a different format from the PDF417 patterns so that the presence of the PDF417 start and stop patterns does not interfere with reading the bar code (FIG. 2A).

The hidden barcode with superimposed marks is then completely or partially covered by an adhesive label to an extent that the barcode information cannot be read. The label is constructed with clear film windows aligned to positions of the start and stop patterns of a PDF417 bar code, but the label is otherwise opaque and covers the barcode to an extent that prevents reading of the hidden activation code.

A second upper level activation code is printed onto the top surface of the label in the form of a PDF417 bar code, except without its stop and start patterns. The printed pattern on the label will be sufficiently aligned on the label so that the combination of the printed pattern on the label and markings on the card surface visible through transparent label windows can be successfully read and interpreted by a PDF417 code scanner (FIG. 2B).

Figure 2A:
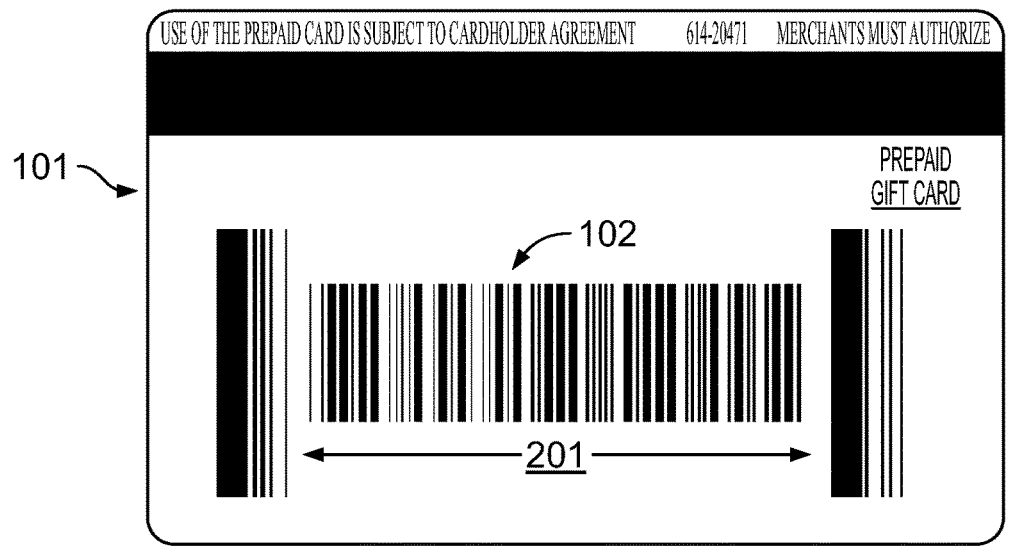
FIG. 2.
Figure 2B:

This embodiment of invention is shown in FIG. 2. FIG. 2A is a gift card 101, having printed thereon a lower level activation code 102, and start/stop codons 201, wherein the start/stop codons are of a different format than the lower level activation code 102. FIG. 2B shows the gift card, having applied thereon a label 105, having clear windows 106, through which the start/stop codons 201 are visible. An upper level activation code 107 is printed on the label 105, in alignment with the start/stop codons 201. In FIG. 2, the lower level activation code is in the form of a one-dimensional linear bar code, while the start/stop codons and the upper level activation code are in the form of a PDF417 bar code. However, the lower level activation code, start/stop codons, and upper level activation code are not limited to these formats.

In another embodiment, the second upper level activation code is printed onto the top surface of the label in the form of a linear bar code except without its stop and start patterns. The same stop and start patterns incorporated into the lower level bar code on the surface of the gift card are visible through windows in the white label. The printed pattern on the label will be sufficiently aligned on the label so that the combination of the printed pattern on the label and stop and start patterns on the card surface visible through transparent label windows can be successfully read and interpreted by a linear bar code scanner. The symbology of the upper and lower bar codes can be chosen to be Code 39, Code 128, or any number of other types, but the type of bar code would preferably be the same for both the upper and lower bar codes, since they each share the same start and stop patterns (FIG. 3).

Figure 3A:
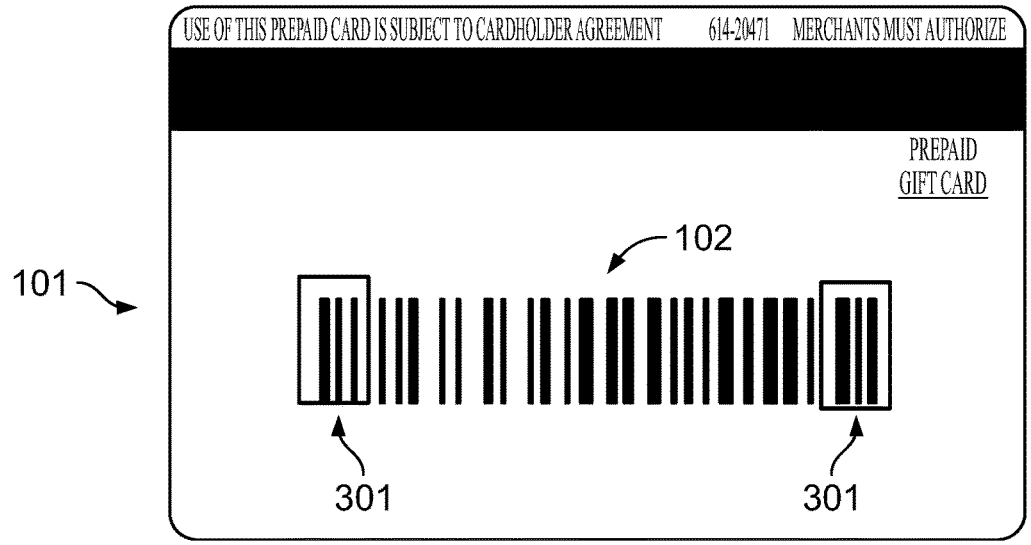
FIG. 3.
Figure 3B:
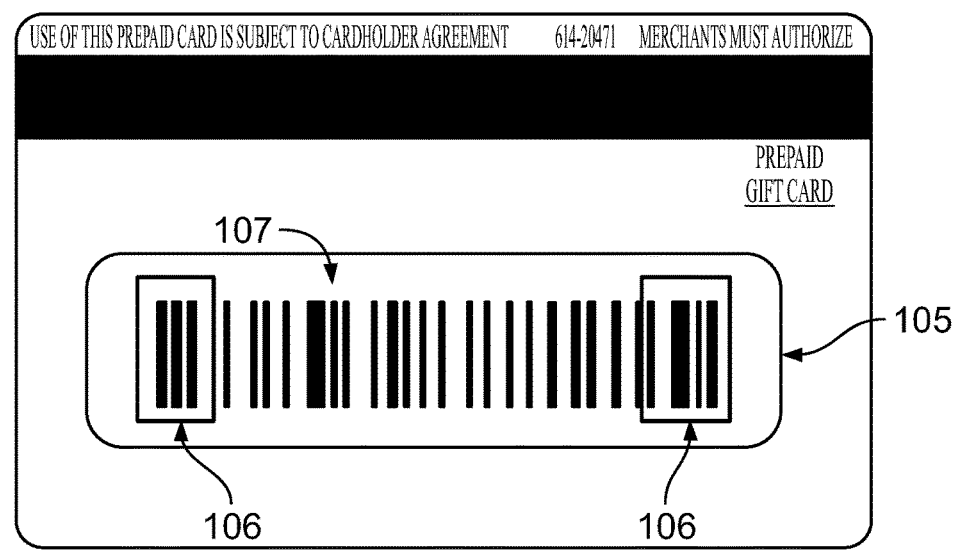

This embodiment of the invention is shown in FIG. 3. FIG. 3A is a gift card 101, having printed thereon a lower level activation code 102, and stop/start codons 301 that are the same format as the lower level activation code. FIG. 3B is the gift card 101 having applied thereon a label 105, with clear windows 106 through which the start/stop codons 301 are visible. An upper level activation code 107 is printed on the label, in alignment with the start/stop codons 301. In FIG. 3, the lower level activation code is in the form of a one dimensional linear bar code (Code 128b format), with the start and stop codons in the same format, and the upper level activation code is also in Code 128b format, and uses the same start and stop codons as the lower level activation code. However, the lower level activation code, start/stop codons, and upper level activation code are not limited to these formats.

In another embodiment, a gift card with a two-step tamper-evident activation process includes a card with an initially inactive state with a structure similar to the previous description. A hidden activation code is printed on the card in the form of a one-dimensional barcode with a superimposed pattern consisting of locator marks and an alignment mark in the format typically used in the construction of a standard two-dimensional quick response (QR) code. The hidden code is covered by a label with windows aligning to the underlying locator and alignment marks. The label has a pattern printed on it such that the combination of that printed pattern and the underlying marks visible through windows is readable as a QR code as before.

Furthermore, this label is designed so that its removal from the card will be accompanied by a distortion, for example the label edges curl up tightly together into a cylinder. The label is designed so that it cannot easily be unrolled flat again to reapply it to the surface of the card in a manner that aligns with the underlying locator marks and alignment mark on the card. The inability to reapply the label properly prevents a QR scanner from interpreting the 2D code; therefore, the card's activation process is self-disabling. If a thief peels away the label to reveal the card's identifier and then reapplies it, the label will have visible distortion that evidences tampering, and the misaligned QR code will fail to read.

The label can be designed in the following way to enable the tamper-evident feature. Firstly, a clear coating, for example an energy curable coating, is applied to the surface of the label. Many energy curable coatings shrink to some extent dimensionally when they are cured, and excessive shrinkage results in a coating defect known as a "curl." The contraction of the surface coating causes the entire substrate to distort, buckle, or curl up upon curing. The energy curable coating in this instance is preferably designed to maximize curl of the label. Secondly, the adhesive of the label is chosen such that it preferably forms a strong cohesive bond between the card surface and the label substrate. The cohesive bond of the label would preferably be weak enough so that the label can be easily peeled off, but it also would preferably be strong enough to overcome the tendency of the surface coating on the label to cause it to curl up off of the card.

Figure 4A:
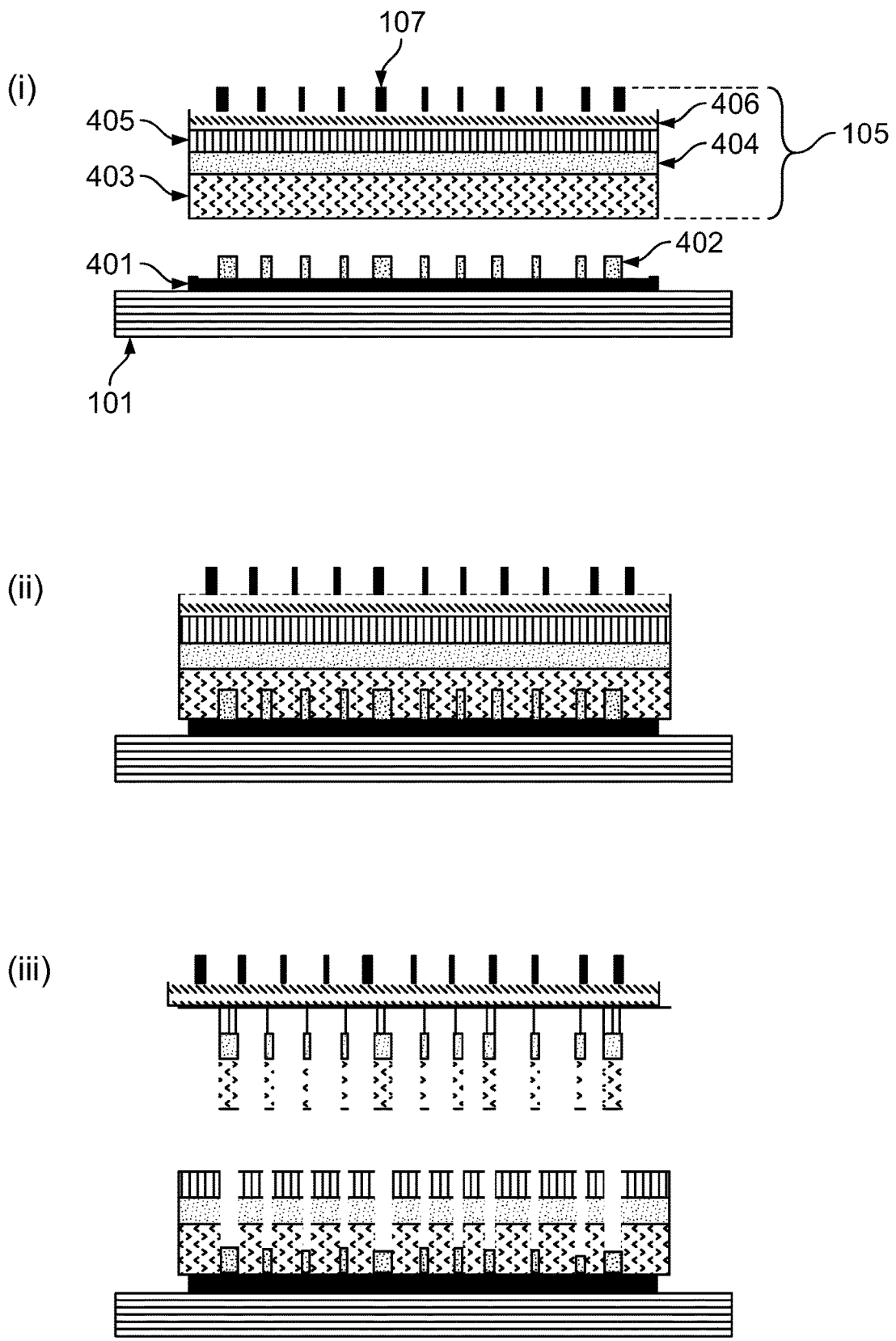
FIG. 4.
Figure 4B:
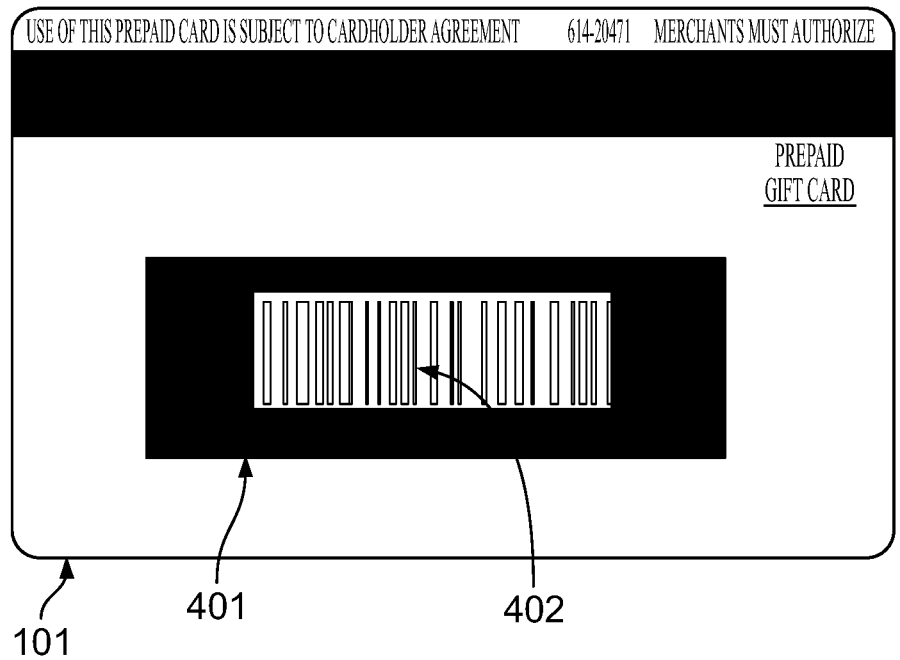

In another embodiment, a gift card with a two-step tamper-evident activation process includes a card with an initially inactive state. A hidden activation code is printed on the card in the form of a latent invisible bar code written over a solid black background. The latent invisible bar code is printed using an ink with a release property, such that an adhesive on the back side of a label will adhere to the surface of the gift card and to the surface of the solid black background in all areas except the surface of the latent bar code. The latent barcode is a code in which the normally dark bars are printed with the special invisible ink (FIG. 4B).

The latent invisible barcode and the solid black background are then covered by an opaque white adhesive label. This opaque white adhesive label has the following structure. The substrate material for the label is preferably a clear polymer film, which may be poly(ethylene terephthalate) (PET), a clear polyolefin, or any other clear polymer film, including a distortable polymer film with high extensibility as previously described. The lower surface of the polymer film substrate facing the gift card is printed with a solid opaque white ink. Furthermore, an adhesive is applied over the surface of the white ink used to attach the opaque label to the surface of the gift card.

Figure 4C:
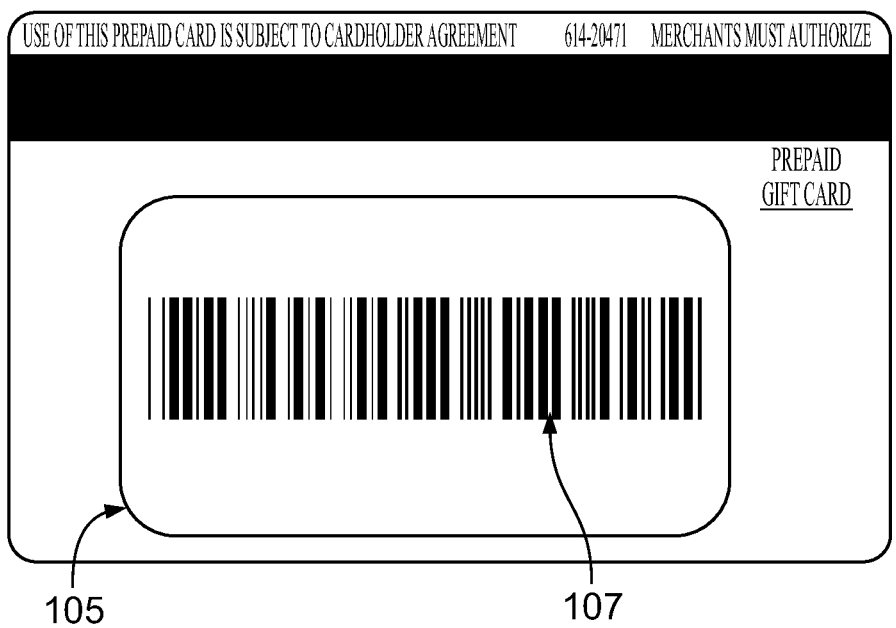

A second upper level activation code is printed onto the top surface of the opaque label in the form of a bar code (FIG. 4C).

The process of card activation will occur in a store cash register. The process of activation will include first a step of reading the upper bar code. Reading of the upper code may cause a web page to open where the card buyer will be required to register the card or to provide additional identifying information for added security. The label will then be peeled off.

The act of peeling off the label will produce a second readable visible barcode on the surface of the gift card from the latent barcode print with release property, because the adhesive and white ink together will detach from the bottom surface of the label and adhere to the surface of the gift card in all areas except that of the printed latent bar code. The black background will be visible through the printed latent bar code, showing as the black bars of the bar code, and the adhesive and white ink that remains on the surface of the black background creates the white spaces of the lower level activation code.

Figure 4D:
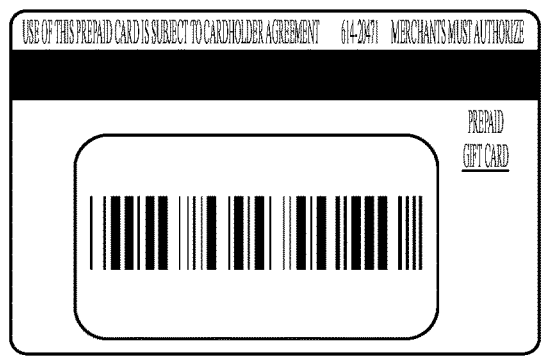
Figure 4D:
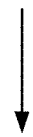
Figure 4D:
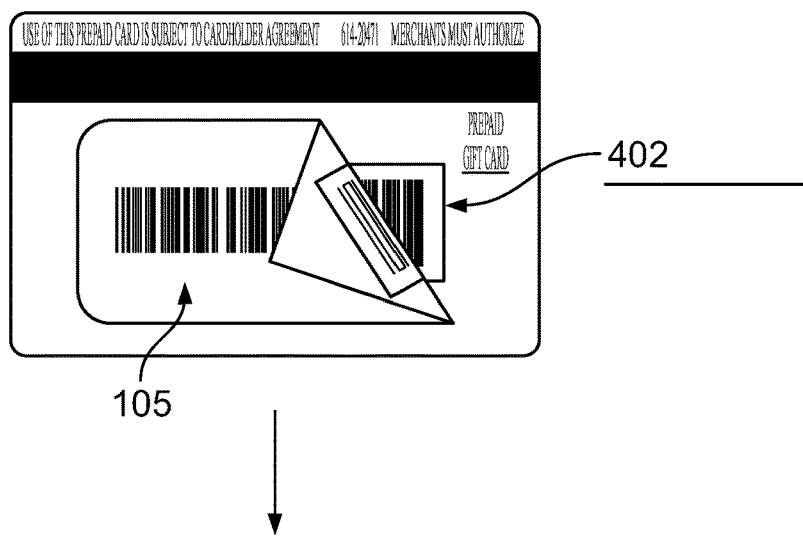
Figure 4D:
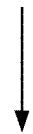
Figure 4D:
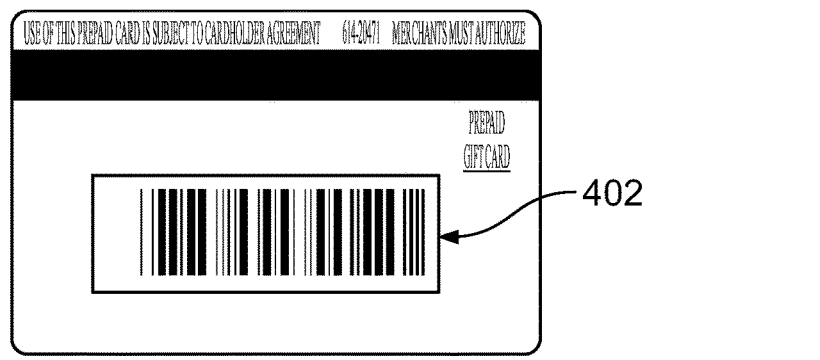
Figure 4D:
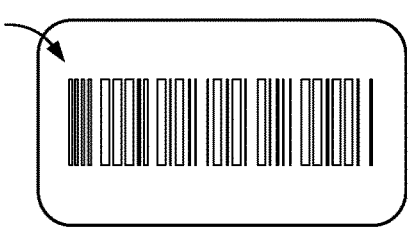

Simultaneously, the detachment of white ink from the back side of the label will generate areas of clear transparent film visible from the top surface of the label under the upper level activation bar code. The appearance of clear film areas under the bar code will cause the upper bar code to become unreadable; therefore, the card's activation process is self-disabling once the label is removed. If a thief peels away the label to generate the card's identifier and then reapplies the label, the upper bar code will no longer be readable. (FIG. 4D).

The second bar code is needed to complete the activation process. The second code also functions as a unique identifier to be used again later when the card is presented to withdraw money.

This embodiment of the present invention is shown in FIG. 4. FIG. 4A is a cross-sectional view of this embodiment of the invention. FIG. 4A(i) shows a gift card/substrate 101, having applied/printed thereon a black background 401. A lower level activation code 402 is printed with a clear ink with a release property, so that the black background shows through the lower level activation code 402, and the lower level activation code is not visible (i.e. latent). The label 105 comprises a layer of adhesive 403; a white ink layer 404; a solid release varnish layer 405; and a clear label substrate 406, having printed thereon an upper level activation code 107. FIG. 4A(ii) shows the label applied on the gift card 101, over the lower level activation code 402, and black background 401. FIG. 4A(iii) shows what happens when the label 105 is peeled off of the gift card 101. The clear label substrate peels away from the solid release varnish 405. However, the adhesive 403, with the white ink layer 404, sticks to the black background 401, except where the lower level activation code 402, printed with the clear ink with a release property is. Where the adhesive 403 sticks to the black background 401, the white ink 404 covers the black background, creating a white background. The adhesive peels away from the lower level activation code 402 printed with clear ink with a release property, so that the lower level activation code 402 is visible as a black lower level activation code (i.e. the black background shows through the clear ink with a release property lower level activation code 402). FIGS. 4B and 4C are a top view of the gift card shown in FIG. 4A(ii). FIG. 4B shows the gift card 101, having applied/printed thereon the black background 401. The lower activation code 402 is printed with a clear ink with a release property, so that it is invisible on the black background 401 (i.e. the black shows through the clear release ink with a release property 402; depicted as a gray area to help with visualization). FIG. 4C is the gift card 101, having applied thereon the label 105. The upper level activation code 107 is printed on the label 105. FIG. 4D depicts an activation sequence. FIG. 4D(i) is the gift card 101, as described in FIGS. 4A to 4C. The upper level activation code 107 is readable, and can be scanned to begin the card activation process. FIG. 4D(ii) shows the label 105 being peeled back. The adhesive 403 with white ink 404 that sticks to the black background provides a white background so that the lower level activation code 402, printed with a clear ink with a release property, and through which the black background is visible as a black lower activation code 402, can be seen. FIG. 4D(ii)(a) shows the label 105 after removal. The upper level activation code 107 is no longer readable, because there are clear patches where the adhesive 403 stuck to the black background 401. FIG. 4D(iii) shows the gift card 101 with the label 105 completely removed. At this point the lower level activation code 402 is readable, and can be scanned to complete the card activation process.

Figure 5A:
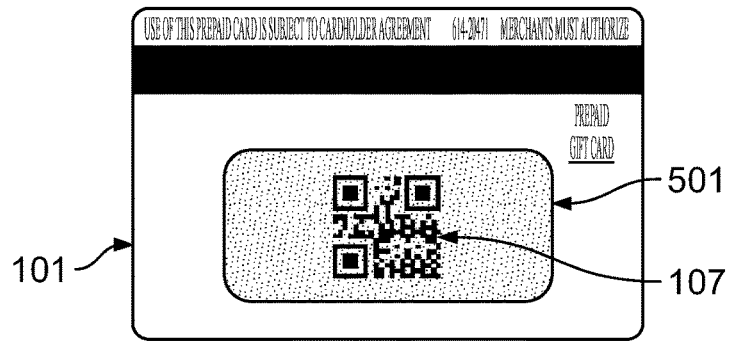
FIG. 5.

In another embodiment, a gift card with a two-step tamper-evident activation process includes a card with an initially inactive state. A hidden activation code is printed on the card in some form using an invisible light sensitive color change ink. The invisible code is covered by a color tinted polymer film label, for example a red-tinted film, which is opaque to light in a wavelength range capable of initiating a color change. The colored polymer film label also has an upper activation code printed on it in some form, which may be a bar code, QR code, or other representation (FIG. 5A).

The upper activation code in the form of a barcode or a QR code is scannable or readable on top of the colored (for example, red) label background. The lower activation code/unique identifier remains invisible, because the color tinted label filters out light in a wavelength range capable of initiating a color-change. Removal of the tinted film label exposes the underlying invisible ink to wavelengths of light capable of initiating color change to develop a readable or scannable lower activation code. (FIG. 5B).

If a thief peels away the red label to develop the color-changing invisible ink, copies the card's identifier, and then attempts to replace the label, then the exposed lower code will now be visible underneath of the replaced label, providing visible evidence of tampering. Furthermore, the card is self-disabling because the upper authentication code will no longer read correctly superimposed over the lower code (FIG. 5C).

The invisible light sensitive color-change ink may optionally incorporate a light sensitizer used to facilitate more rapid color change in visible light. The sensitizer may be incorporated into the color-change ink itself or may be printed on the card in a separate coating layer immediately above or below the color-change ink layer.

Figure 5B:
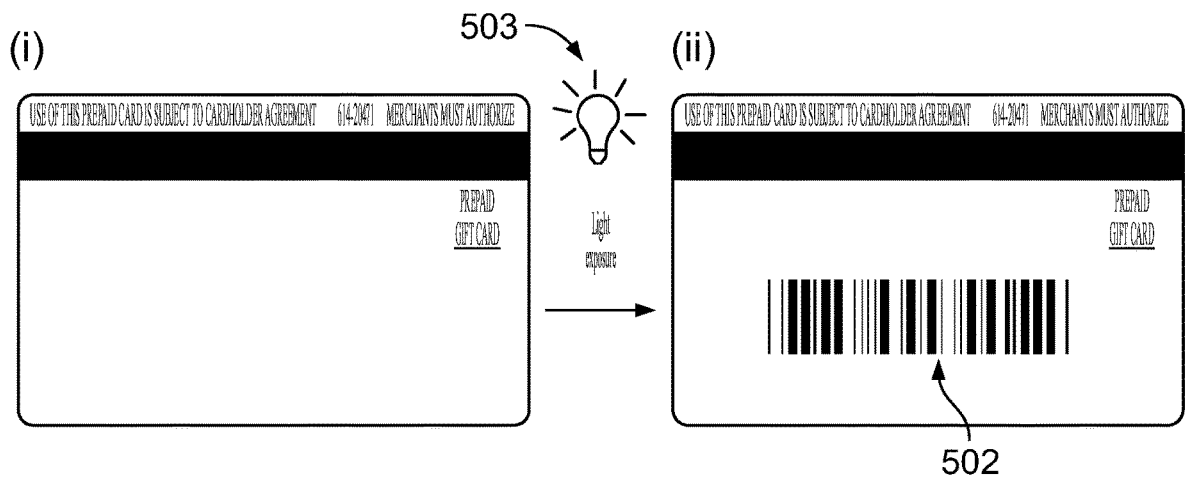
Figure 5C:
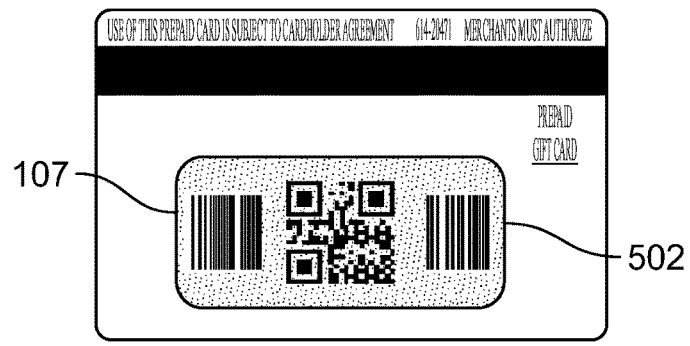

FIG. 5 shows this embodiment of the invention. FIG. 5A shows a gift card 101, having applied thereon a color tinted label 501. The upper level activation code 107 is printed on the color tinted label 501. At this point the upper level activation code 107 is readable, and can be scanned to begin the card activation process. FIG. 5B shows the gift card 101 after removal of the label 501. Immediately upon removal of the label 501, as shown in FIG. 5B(i), the gift card 101 is blank. But, as the gift card is exposed to visible light 503, lower level activation code 502 becomes visible, as shown in FIG. 5B(ii). Lower level activation code 502 is printed with a light sensitive ink which is sensitive to wavelengths of light in the visible range (i.e. visible light 503), and the color develops upon exposure to visible light 503. The color tinted label 501 blocks the wavelengths of light to which the light sensitive ink of lower level activation code 502 is sensitive, so that the lower level activation code 502 does not develop and become visible until after a specified time of exposure to visible light 503. FIG. 5C shows that if an attempt to replace label 501 is made, the upper level activation code 107 is not readable because the lower level activation code 502 is now developed and visible through the tinted label 501, obscuring the upper level activation code 107.

In another embodiment, a gift card with a tamper-evident activation process includes a card with an initially inactive state. A hidden activation code is printed on the card. The printed code also has a clear coating applied over it which has the capability of darkening when exposed to a chemical developer. The card with activation code and darkenable coating is laminated in a structure with a clear polymer window. The activation code visible in the window is covered by an opaque folded peelable pull tab. The surface of the window facing the activation code is coated with a chemical developer. The developer is separated from the darkenable coating by the physical barrier of the pull tab.

The process of card activation requires first peeling off the folded pull tab from the upper surface of the card. The pull-tab is fixed on the surface with an adhesive. Pulling the tab off the surface reveals a window. The revealed window may optionally have a second printed activation code imaged on it. The window may optionally contain a printed instruction, such as "← Pull Tab." The pull tab may optionally incorporate a PIN number or other identifier, such as an upper level activation code, needed for card activation. Pulling out the tab has two functions. Pulling the tab reveals the hidden lower level activation code required to complete the activation of the card (FIG. 6B).

Pulling the tab also removes a barrier between the darkenable overprint coating and a layer of chemical developer applied to the inside surface of the clear window. The revealed lower code will be readable for an interval of time long enough to complete an activation process after the pull tab is removed. Reaction with the contacted developer will cause the background to progressively darken until the code can no longer subsequently be read correctly (FIG. 6C).

Figure 6A:
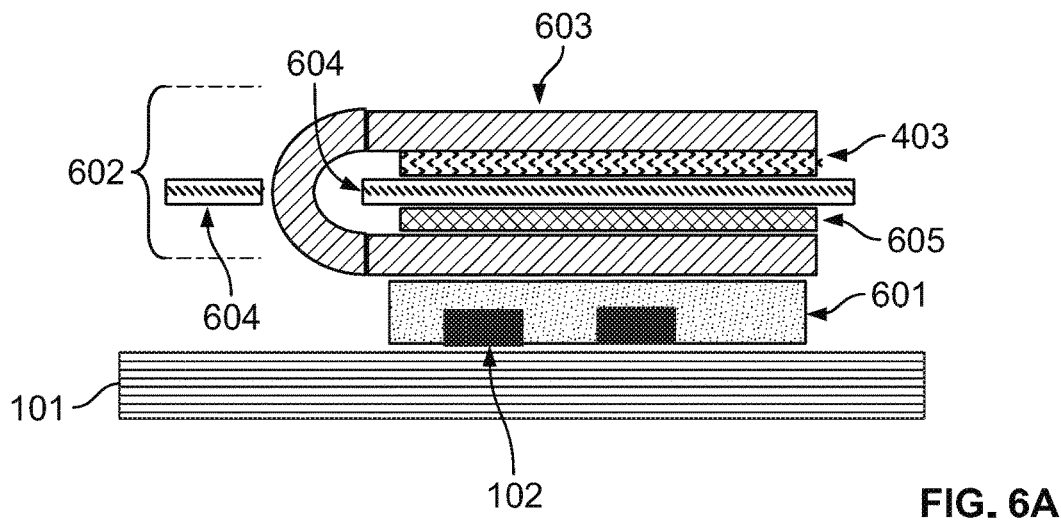
FIG. 6.
Figure 6B:
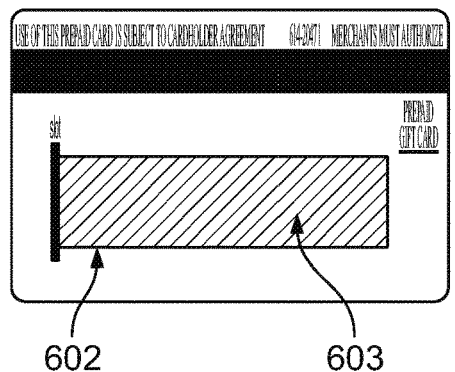
Figure 6B:
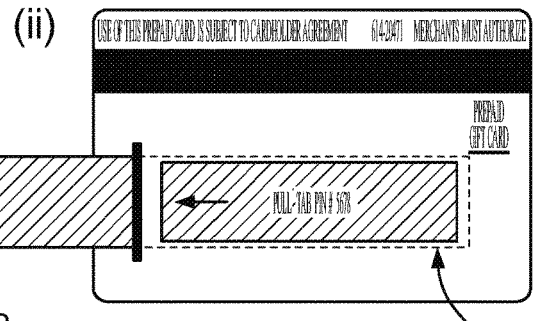
Figure 6B:
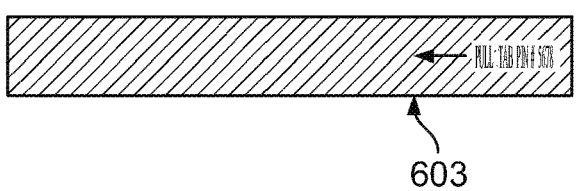
Figure 6B:
Figure 6C:
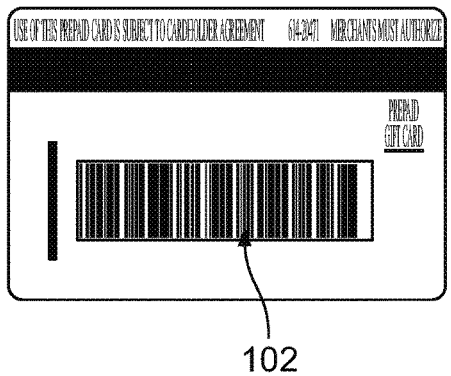
Figure 6C:
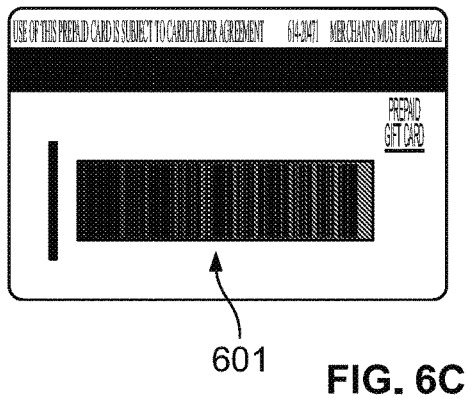

A cross-sectional view of the structure of the gift card with incorporated folding pull tab is shown in FIG. 6A.

This embodiment of the invention is depicted in FIG. 6. FIG. 6A is a cross-sectional view of a gift card 101, having printed thereon a lower level activation code 102. A clear coating 601 is applied over the lower level activation code 102, wherein the clear coating darkens upon exposure to a developer. A laminate structure 602 is applied on the gift card 101, covering the lower level activation code 102, and the clear coating 601. The laminate structure comprises a clear substrate with a slot 604; a developer 605 coated on a bottom surface of the clear substrate; an adhesive 403 coated on a top surface of the clear substrate; a pull tab 603, wherein the pull tab is below the developer layer 605, and above the clear coating 601, blocking the developer 605 from coming into contact with the clear coating 601; wherein the pull tab 603 extends up through the slot in the clear substrate 604, and folds over to stick to the adhesive 403 applied on the top surface of the clear substrate 604. FIG. 6B is a top view of the gift card 101 described in FIG. 6A. The laminate structure 602, with the pull tab 603 folded on the top, is shown in FIG. 6B(i). FIG. 6B(ii) shows the gift card with the pull tab 603 peeled back from the adhesive 403 on the top surface of the clear substrate 604. A portion of the pull tab 603 is visible through the clear substrate 604. The pull tab 603 visible through the clear substrate 604 optionally has an upper level activation code 107, or instructions/PIN number 606, printed thereon. FIG. 6B(iii) shows the pull tab 603 pulled completely out of the slot of the clear substrate 604. The lower level activation code 102 is visible, is readable, and can be scanned. The developer 605 is now in contact with the clear coating 601. FIG. 6C(i) shows the gift card 101 immediately after the pull tab has been pulled out, wherein the lower level activation code 102 is readable and can be scanned. FIG. 6C(ii) shows the gift card 101 after the pull tab 603 has been completely removed, and the developer 605 has been in contact with the clear coat 601 for a period of time, e.g. about 1 hour. The clear coat 601 has darkened, obscuring the lower level activation code 102, which is no longer readable.

Figure 7A:
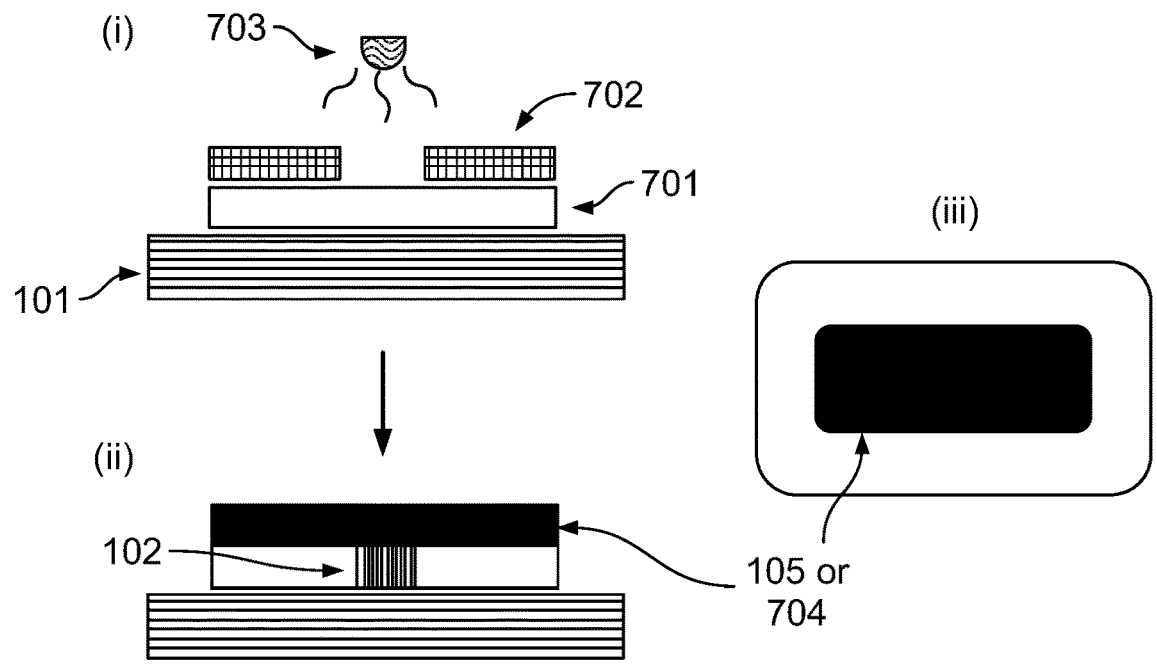
FIG. 7.

In another embodiment, a gift card with a tamper-evident activation process includes a card with an initially inactive state. A p-type photochromic ink is printed on the surface of the card to make a photoimageable area, which is initially transparent and colorless. A lower level activation code is formed within the photoimageable area by patterned light exposure on the card, forming a dark colored exposed image. The patterned exposure might occur by shining light through the image of a bar code in a patterned mask, or the patterned light exposure might occur by illuminating the surface of the card with collimated light from a laser. The wavelength of the patterned light exposure is outside of the range of visible light, preferably in the range of ultraviolet light wavelengths (FIG. 7A).

The surface of the card is coated with a p-type photochromic material, which absorbs the patterned light exposure at wavelength 1 and changes color in exposed areas. The photochromic activation code is then immediately hidden underneath of an opaque removable label.

The process of card activation requires first peeling off the opaque label to reveal the light-imaged bar code beneath it. The revealed bar code is readable with a bar code scanner for a short interval of time, because the p-type photochromic material will begin to fade and revert to a colorless state once revealed and exposed to visible light.

Figure 7B:
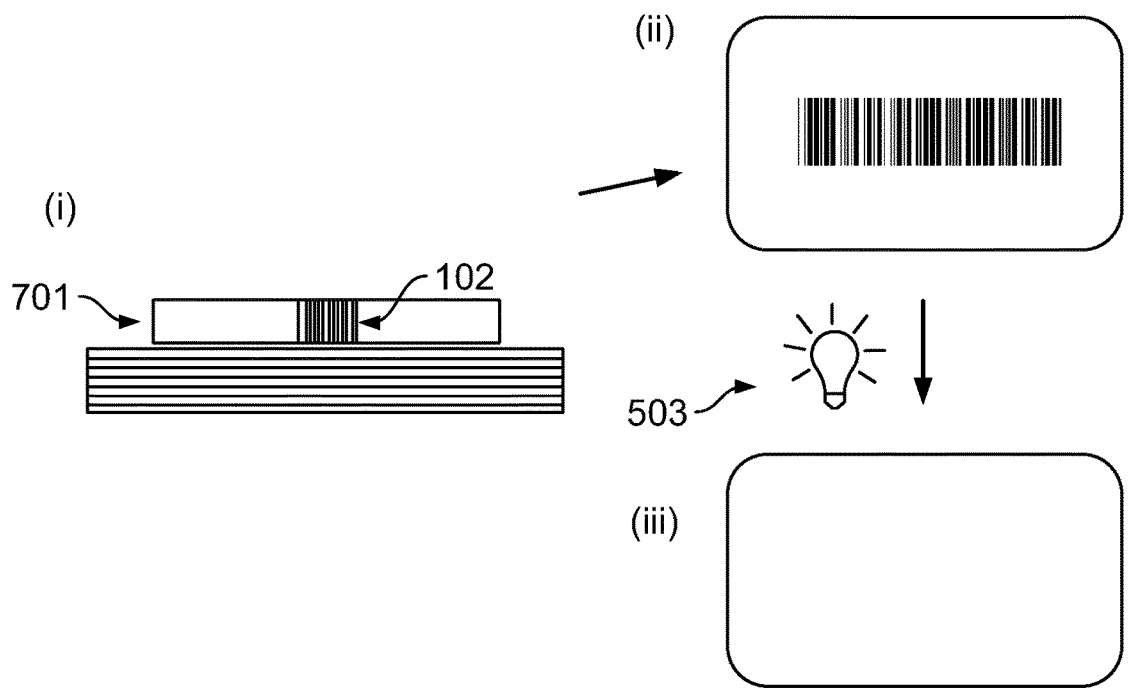

The card in this manner disables itself after the first instance of use so that the activation code can only be accessed briefly in a short interval of time when the card is purchased (FIG. 7B).

This embodiment of the present invention is shown in FIG. 7. FIG. 7A(i) is a cross-sectional view of a gift card 101, having a p-type photochromic ink 701 coated thereon to create an imageable area. The p-type photochromic ink 701 darkens upon exposure to UV (i.e. non-visible) light 703. A mask 702 is placed on top of the p-type photochromic ink 701, covering areas that are not to be imaged. Lower level activation code 102 is imaged through the spaces in the mask using UV (non-visible) light 703. Alternatively, collimated UV light (e.g. collimated laser light) may be used to image the lower level activation code 102, in which instance the mask 702 would not be necessary. In FIG. 7A(ii), an opaque label 105, or opaque scratch-off ink 704 is applied over the p-type photochromic ink layer 701, blocking exposure to light. FIG. 7A(iii) is a top view of the gift card of FIG. 7A(ii). FIG. 7B(i) shows the gift card 101 with the opaque label 105 or scratch-off ink 704 removed. Removal exposes the p-type photochromic ink to visible light 503. Immediately upon removal of label 105 or scratch-off ink 704, the lower level activation code 102 is visible, readable, and can be scanned, as shown in the top view of the gift card 101 in FIG. 7B(ii). After a period of time exposed to visible light 503, the lower level activation code 102, which was imaged with UV light, fades and disappears, because the p-type photochromic ink fades and disappears upon exposure to visible light 503. Thus, the lower level activation code 102 can no longer be scanned.

Figure 8A:
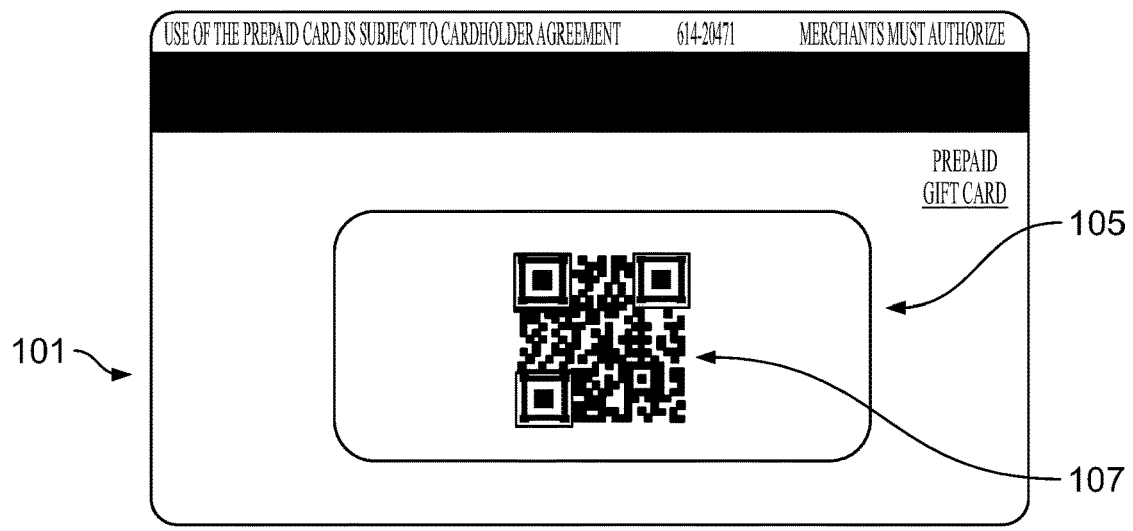
FIG. 8.
Figure 8B:
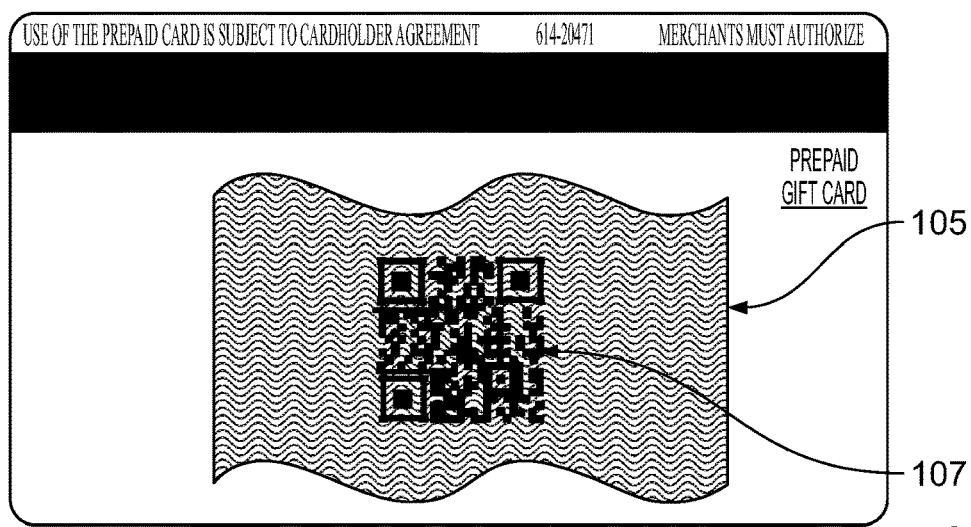
Figure 8C:
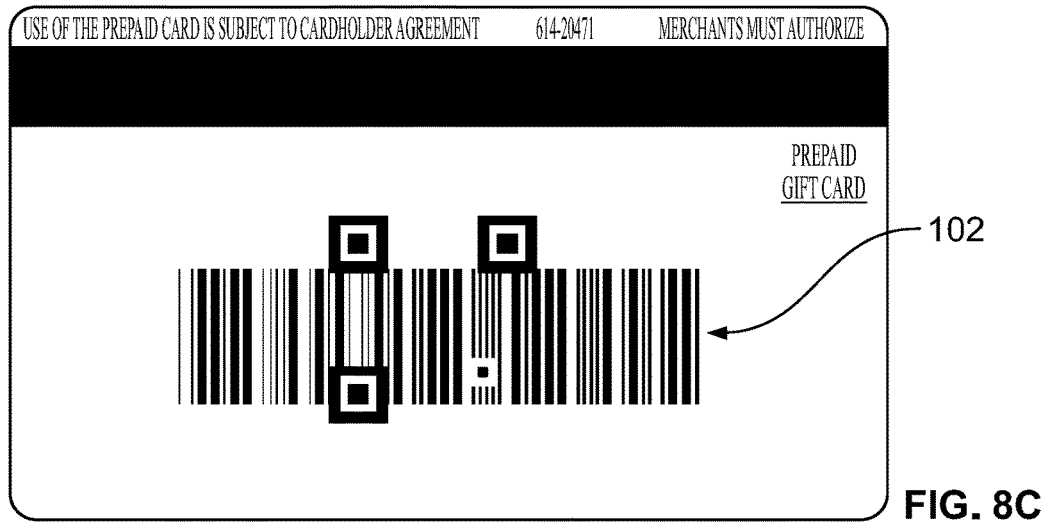

One variation of the embodiment shown in FIG. 1 of the present invention is shown in FIG. 8. FIG. 8A shows a gift card 101, having applied thereon a label 105. An upper level activation code 107 is printed on the label 105. The upper level activation code 107 is readable, and can be scanned to begin the card activation process. FIG. 8B shows the label 105 after peeling a portion of the label 105 off. The label 105 becomes stretched and distorted. The upper level activation code 107 also becomes distorted and can no longer be read. FIG. 8C shows the gift card 101 after the label 105 is completely removed. The lower level activation code 102 is revealed. The lower level activation code is readable, and can be scanned to complete the activation process of the gift card 101.

EXAMPLES

The following examples illustrate specific aspects of the present invention, and are not intended to limit the scope thereof in any respect, and should not be so construed.

Example 1. Distortable Label with Extensible Film

Sun Chemical SunSharp White solvent-based flexographic ink was applied to the corona-treated surface of black-tinted S-11449BL 80 gauge Min-Wrap Film from Uline to make an opaque white layer on the film. A PDF417 code design was digitally printed onto the white ink surface of the film. E5740 Water-based Emulsion Adhesive from Avery Dennison was modified by addition of 20% Dermulsene 1513 to increase its peel strength. The modified adhesive was coated onto the backside of the film with a 2 mil Bird applicator. The film was transferred onto a release liner after the adhesive had dried to create a sheet of label stock. The label stock was cut into the shape of a rectangular label approximately 1 in.×2 in. The label was peeled from the release liner and applied to the surface of a Target plastic gift card to conceal a linear barcode on the card surface. The label was imaged with an infrared camera to confirm that the concealed barcode was also not readable underneath the label in infrared wavelengths.

A linear barcode was digitally printed on the label surface, and the resulting label barcode was readable with a barcode scanner.

The label remained on the surface of the card overnight to develop a strong adhesive bond with its surface. The label was then peeled from the card to reveal the underlying hidden barcode. Peeling caused distortion and stretching of the label. The distorted barcode pattern was subsequently no longer readable using the barcode scanner. The adhesive peeled cleanly off the card leaving minimal adhesive residue. The revealed hidden barcode was readable with a barcode scanner.

Example 2. Distortable Label with Embossed Extensible Film

Coextruded black and white polyethylene film with elongation>400% was obtained from Berry Global. The film was embossed with an array of square grid lines with approximately 200 μm spacing. The black side of the film was laminated to transfer adhesive tape pre-coated on a release liner. Adhesive transfer tape 9471LE is a suitable product available from 3M Corporation. The release liner was stripped away leaving the adhesive bonded to the black surface of the film. The film was then laminated to a secondary release liner. The film was die-cut into the shape of approximately 1 in.×2 in. rectangular labels suitable for application to gift cards.

A label was peeled from the release liner and applied to the surface of a Target plastic gift card with the white side facing upward to conceal a linear barcode on the card surface. The underlying barcode was invisible under the opaque label film, and no relief pattern of the barcode could be discerned in the top surface of the label film.

The label remained on the surface of the card overnight to develop a strong adhesive bond with its surface. The label was then peeled from the card to reveal the underlying hidden barcode. Peeling caused distortion and stretching of the label. The distorted barcode pattern was subsequently no longer readable using the barcode scanner. The adhesive peeled cleanly off the card leaving minimal adhesive residue. The revealed hidden barcode was readable with a barcode scanner.

Example 3. Distortable Label with Extensible Film and Alignment Mark Windows

Sun Chemical Flexomax High Opacity White solvent-based flexographic ink was applied to the surface of Parafilm M from Bemis to make an opaque white layer on the formerly transparent film. A QR code design was digitally printed onto the white ink surface of the film. Small square windows were created in the white layer in the locations corresponding to the three locator marks and one alignment mark of the QR code. The substrate with QR code and windows was cut into the shape of a label. A solution of a hot melt adhesive diluted in MEK solvent was applied to the back side of the label by painting with a small brush.

An American Express plastic gift card was used as the gift card substrate. A one-dimensional linear bar code was printed on the back side of the card used as the lower level hidden bar code. Three square locator marks and one alignment mark were placed on the back side of the card superimposed over the linear bar code. A cell phone app was used to demonstrate readability. The lower level bar code with superimposed markings was initially readable.

The label was attached to the card to hide the lower level code, aligning the marks on the card with the windows in the label. The card and label were placed in a 50° C. oven for 5 min. This thermal treatment set the adhesive to form a sufficient bond to the card.

The upper level QR code on the label was read using a cell phone app to simulate a 2-card activation process. The QR code was readable. The label was peeled off the card. Pealing caused distortion and stretching of the QR code pattern such that the QR code data no longer aligned sufficiently with the marks on the card surface. The QR coda data was verified to be unreadable. The act of removing the label disables a subsequent attempt to read the QR code. The revealed lower-level code on the card was also again readable (FIG. 8).

Example 4. Card with Photoimageable p-Type Photochromic Ink

A white cardboard substrate was cut into the shape of a gift card. A solution of 1 wt. % Aberchrome 670 from TCI in n-propanol was applied to the surface of the card using a paint brush. A reversed negative bar code image was printed onto PET transparency film using a laser printer. The transparency was placed on top of the painted photochromic patch on the card. A 365 nm wavelength UV flashlight was used to expose the photochromic material through this mask. The image of a barcode was produced on the surface of the gift card by coloration of the photochromic Aberchrome material. The bar code image was quickly covered by a piece of black 3NT-3 Leneta paper simulating an opaque black label. Glue was applied to the side of the Leneta paper facing the photochromic patch.

At a later time, the black label was peeled off to simulate a process of revealing the hidden activation code to activate the card. The photoimaged bar code was again visible, but the image faded to invisibility within a few minutes of exposure to visible light. The code is therefore accessible for use only once within a short period of time after exposure to room light.

Example 5. Card with Darkenable Coating, Chemical Developer, and Pull-Tab

A white cardboard substrate was cut into the shape of a gift card. A lower level activation code in the form of a one-dimensional linear bar code was applied to the surface of the card.

TABLE 1

| Example 5 chemical composition for the darkenable coating | |
|---|---|
| Material | wt % |
| Gelatin G9391 from Sigma Aldrich | 0.60 |
| Deionized Water | 21.35 |
| Potassium Bromide | 2.00 |
| Potassium Iodide | .05 |
| Silver Nitrate Solution (9.1% aqueous) | 26.00 |

TABLE 1-continued

| Example 5 chemical composition for the darkenable coating | |
|---|---|
| Material | wt % |
| Ethanol | 25.00 |
| Sodium Hydroxide Solution (20% aqueous) | 25.00 |
| Total | 100.00 |

The Example 5 darkenable coating composition was made in dim lighting conditions. Gelatin was dissolved first in warm water at 55° C. Then, KBr and KI were added. The AgNO$_3$ solution was next added slowly with stirring during a 10-minute interval. The solution was maintained at 55° C. for a further 10-minute interval after all of the AgNO$_3$ solution had been added. Then, the composition was allowed to cool. Ethanol and sodium hydroxide were added last while the composition was still warm (~40° C.).

TABLE 2

| Example 5 chemical composition for the developer | |
|---|---|
| Material | wt % |
| Covinax 165-00 Water-based Adhesive | 85.97 |
| Metol Photographic Developer from Sigma Aldrich | 1.75 |
| Sodium Sulfite | 3.51 |
| Triethanolamine | 8.77 |
| Total | 100.00 |

The Example 5 darkenable coating was applied over the bar code on the gift card using a cotton swab. The developer was applied to a clear PET film window located over the bar code prior to insertion of a pull tab between the window and the bar code and lamination of the PET to the gift card.

FIG. 6 captures the process of removing the pull tab to reveal an activation bar code, which remains readable for up to one day before darkening of the bar code area interferes with reading by a bar code scanner.

Example 6. Card with Color Tinted Red Film Window and Invisible Light Sensitive Color-Change Ink The chemical compositions in Table 3 were made for the photochromic color-change ink, inhibitor, and light sensitizer.

TABLE 3

| Example 6 chemical compositions of color-change ink and light sensitizer | | |
|---|---|---|
| Material | Ex. 6A: Color Change Ink | Ex. 6B: Light Sensitizer |
| DPT-285 Nitrocellulose Varnish | 80.00 | 90.00 |
| Benzoyl Leucomethylene Blue Color Former | 0.60 | |
| Ethyl Acetate | 19.40 | |
| Isopropylthioxanthone | | 10.00 |
| Total | 100.00 | 100.00 |

A white cardboard substrate was cut into the shape of a gift card. The light sensitizer was applied first to the surface of the card with a cotton swab in the form of a light yellow-colored rectangular patch. The color-change ink was applied over the patch of sensitizer by painting numbers with a small brush using a stencil.

Numbers were painted with color-change ink in dim light and were initially invisible on the light-yellow background. Clear PET film was colored red by printing a UV curable flexographic red ink on its surface. An upper level activation code in the form of a linear bar code was digitally printed on the PET surface. The film was cut in the shape of a label and applied over the lower level invisible color-change activation code with adhesive. The red label shielded the light sensitive color-change ink from light in a range of wavelengths that activate color change. Removal of the red label exposed the light sensitive material to light, causing the lower level code to develop.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A self-disabling tamper evident value card activation system comprising:
   a) a substantially planar substrate that is a value card;
   b) a lower level redemption and/or activation code printed on a surface of the value card;
   c) a removable label, wherein the label comprises a highly extensible polymer film material, having a top surface, and a bottom surface that comprises an adhesive where the bottom surface faces the surface of the value card, wherein the highly extensible polymer film is opaque and comprises a top-surface pigmented film laminated or sealed to, or coextruded with a bottom-surface polyolefin film to make a multi-ply film structure, wherein the label is applied over the lower level activation code, and the lower level activation code is hidden by the label; and
   d) an upper level observable activation code printed on a top surface of the label;
   wherein:
      i. both the lower level hidden code and the upper level observable code must be read to activate the card; and
      ii. removal of the label renders the upper level activation code unreadable, or the lower level activation code unreadable, or both the upper level and lower level activation codes unreadable.

2. The system of claim 1, wherein the highly extensible polymer film material easily stretches or distorts upon label removal.

3. The system of claim 1, wherein the multi-ply film structure is a white top film joined to a tinted or black bottom film.

4. The system of claim 1, further comprising a tinted adhesive applied to the bottom surface of the polymer film.

5. The system of claim 1, wherein the surface of the extensible polymer film is embossed with microscopic features that eliminate the appearance of a visible relief pattern from the underlying hidden lower level activation code.

6. The system of claim 1, wherein the lower level activation code is a barcode.

7. The system of claim 1, wherein the upper level activation code is a quick response (QR) code.

8. The system of claim 1, wherein the upper level activation code is a PDF417 code.

9. The system of claim 1, wherein the upper level activation code is a one dimensional barcode.

10. The system of claim 9, wherein the one dimensional barcode is in Code 39 format or Code 128 format.

11. The system of claim 1, wherein:
   a) the lower level activation code is printed using latent invisible ink with a non-stick release property onto the surface of the card in the form of a barcode on top of a black background; and
   b) the removable label comprises:
      i. a label substrate material that is a clear polymer film having a bottom surface which faces the card, and top surface;
      ii. a release layer printed on the bottom surface of the label;
      iii. an opaque white ink printed on the release layer; and
      iv. an adhesive applied on top of the white ink, wherein the adhesive is used to attach the label to the card; and
      v. an upper level activation code printed on the top surface of the label;
   wherein:
      i. removal of the label from the card causes the white ink and adhesive to separate from the bottom surface of the label and adhere to the card in all contacted areas except for the area on the card printed with the latent invisible ink with the non-stick release property;
      ii. the removal of the label and detachment of the white ink from the label causes the latent lower level activation code to become visible as a black barcode on a white background, so that the lower level activation code on the card becomes readable by a barcode scanner; and
      iii. wherein simultaneously the upper level activation code on the top surface of the label becomes unreadable because the detachment of white ink creates clear windows in the polymer film substrate underlying the upper level activation code.

12. The system of claim 1, wherein:
   a) an imageable area is coated with a p-type photochromic ink on a surface of the card;
   b) the lower level activation code is imaged on the imageable area by patterned light exposure outside of the range of visible wavelengths, which causes the photochromic ink to change color and darken in exposed areas; and
   c) the opaque removable adhesive label is applied on the surface of the card, covering the imaged lower level activation code and imageable area;
   wherein:
      i. removal of the label reveals the lower level activation code, which remains readable for a short interval of time;
      ii. the p-type photochromic ink previously darkened by light outside of visible wavelengths fades to invisibility upon exposure to light of visible wavelengths.

13. The system of claim 12, wherein the patterned light exposure occurs by shining light through the image of a bar code in a patterned mask.

14. The system of claim 12, wherein the patterned light exposure occurs by illuminating the p-type photochromic ink with collimated light from a laser.

15. A self-disabling tamper evident value card activation system comprising:
   a) a substantially planar substrate that is a value card;

b) a lower level redemption and/or activation code printed on a surface of the value card;
c) a removable label, wherein the label comprises a highly extensible polymer film material, having a top surface, and a bottom surface that comprises an adhesive where the bottom surface faces the surface of the value card, wherein the label is applied over the lower level activation code, and the lower level activation code is hidden by the label; and
d) an upper level observable activation code printed on a top surface of the label;
wherein:
   i. both the lower level hidden code and the upper level observable code must be read to activate the card; and
   ii. removal of the label renders the upper level activation code unreadable, or the lower level activation code unreadable, or both the upper level and lower level activation codes unreadable; and
wherein:
e) underlying marks are printed on the surface of the card adjacent the lower level activation code;
f) the removable label is opaque, except for clear windows which are aligned with the underlying marks printed on the surface of the card so that the underlying marks are visible through the clear windows in the label; and
g) the upper level activation code is printed on the top surface of the label in alignment with the underlying marks printed on the surface of the card and visible through the clear windows of the removable label;
wherein:
   i. the underlying marks are necessary location marks, alignment marks, or start- and stop-codes required to scan and read the upper level activation code; and
   ii. removal of the label to reveal the lower level hidden activation code necessarily causes the upper level activation code to become unreadable, because the upper level activation code no longer aligns with the underlying marks printed on the surface of the substrate because the label is distorted by removal.

16. The system of claim 15, wherein the removal of the label from the card is accompanied by a distortion of the label such that its edges curl up tightly together into a cylinder.

17. The system of claim 16, wherein the label comprises an energy curable coating which is designed to cause a high degree of curl of the label upon removal of the label from the substrate.

18. The system of claim 15, wherein:
a) the lower level activation code is printed using latent invisible ink with a non-stick release property onto the surface of the card in the form of a barcode on top of a black background; and
b) the removable label comprises:
   vi. a label substrate material that is a clear polymer film having a bottom surface which faces the card, and top surface;
   vii. a release layer printed on the bottom surface of the label;
   viii. an opaque white ink printed on the release layer; and
   ix. an adhesive applied on top of the white ink, wherein the adhesive is used to attach the label to the card; and x. an upper level activation code printed on the top surface of the label;
wherein:
   iv. removal of the label from the card causes the white ink and adhesive to separate from the bottom surface of the label and adhere to the card in all contacted areas except for the area on the card printed with the latent invisible ink with the non-stick release property;
   v. the removal of the label and detachment of the white ink from the label causes the latent lower level activation code to become visible as a black barcode on a white background, so that the lower level activation code on the card becomes readable by a barcode scanner; and
wherein simultaneously the upper level activation code on the top surface of the label becomes unreadable because the detachment of white ink creates clear windows in the polymer film substrate underlying the upper level activation code.

19. A self-disabling tamper evident value card activation system comprising:
a) a substantially planar substrate that is a value card;
b) a lower level redemption and/or activation code printed on a surface of the value card;
c) a removable label, wherein the label comprises a highly extensible polymer film material, having a top surface, and a bottom surface that comprises an adhesive where the bottom surface faces the surface of the value card, wherein the label is applied over the lower level activation code, and the lower level activation code is hidden by the label; and
d) an upper level observable activation code printed on a top surface of the label;
wherein:
   i. both the lower level hidden code and the upper level observable code must be read to activate the card; and
   ii. removal of the label renders the upper level activation code unreadable, or the lower level activation code unreadable, or both the upper level and lower level activation codes unreadable; and
wherein:
e) the lower level activation code is printed using a light sensitive color change ink, which is invisible prior to exposure to specific wavelengths of light, onto the surface of the value card;
f) the removable label comprises a color tinted polymer film adhesive label on which the upper level activation code is printed; and
g) the colored removable label excludes light in wavelengths absorbed by the light sensitive color change ink;
wherein, when the label is removed:
i. the lower level activation code printed with light sensitive color change ink is exposed to wavelengths of light that initiate color change to develop the lower level activation code, and the lower level activation code becomes readable; and
ii. the upper level activation code becomes unreadable.

20. The system of claim 19, further comprising:
a) underlying marks printed on the surface of the card;
b) the upper level activation code printed on the color tinted polymer film label in alignment with the underlying marks printed on the surface of the card and visible through the color tinted polymer film label;
wherein:

i. the underlying marks are necessary location marks, alignment marks, or start- and stop-codes required to scan and read the upper level activation code; and ii. removal of the label to reveal the lower level hidden activation code necessarily causes the upper level activation code to become unreadable, because the upper level activation code no longer aligns with the underlying marks printed on the surface of the substrate because the label is distorted by removal.

21. The system of claim 19, wherein the color tinted polymer film is red tinted.

22. A self-disabling tamper evident value card activation system comprising:
   a) a substantially planar substrate that is a value card;
   b) a lower level redemption and/or activation code printed on a surface of the value card;
   c) a removable label, wherein the label comprises a highly extensible polymer film material, having a top surface, and a bottom surface that comprises an adhesive where the bottom surface faces the surface of the value card, wherein the label is applied over the lower level activation code, and the lower level activation code is hidden by the label; and
   d) an upper level observable activation code printed on a top surface of the label;
   wherein:
      i. both the lower level hidden code and the upper level observable code must be read to activate the card; and
      ii. removal of the label renders the upper level activation code unreadable, or the lower level activation code unreadable, or both the upper level and lower level activation codes unreadable; and
   wherein:
   e) a clear coating is applied over the lower level activation code, wherein the clear coating darkens when exposed to a chemical developer;
   f) the removable label is in the form of a laminate structure, wherein the structure has a bottom surface, a top surface, a clear window, and a slot configured for insertion of a peelable pull tab;
   g) a chemical developer is coated onto a bottom surface of the clear window in the laminate structure, wherein the bottom surface of the clear window faces the printed lower level activation code;
   h) a peelable pull tab passes through a slot in the laminate structure, and covers the chemical developer on the bottom surface of the clear window, physically separating the chemical developer on the clear window and the darkenable coating on the lower level activation code;
   i) the peelable pull tab has a portion that extends through the slot to the outside of the laminate structure;
   j) the extended portion of the peelable pull tab is folded back over the top surface of the laminate structure, to cover the top surface of the clear window, and adhered to the top surface of the laminate structure; and
   k) the laminate structure is laminated to the card so that the bottom surface is in contact with the card, over the printed lower level activation code, hiding the lower level activation code, to obtain a laminated card;
   wherein:
      i. in a first activation step the extended portion of the peelable pull tab is removed from the top surface of the clear window, exposing the top surface of the clear window;
      ii. in a second activation step the peelable pull tab is pulled out from the laminate structure through the slot, thereby revealing the lower level activation code through the clear window, and bringing the developer into contact with the darkenable coating on the lower level activation code;
      iii. the lower level activation code is readable with a scanner for a short interval of time, before the chemical developer reacts with the coating to darken the coating so that the lower level activation code becomes unreadable.

23. The system of claim 22, wherein a top surface of the peelable pull tab visible under the clear window is printed with an upper level activation code, and the upper level activation code is scanned in the first activation step.

24. The system of claim 23, wherein a top surface of the peelable pull tab visible under the clear window is printed with instructions, a personal identification number (PIN), or other key information necessary to initiate the first activation step.

* * * * *